UNITED STATES PATENT OFFICE.

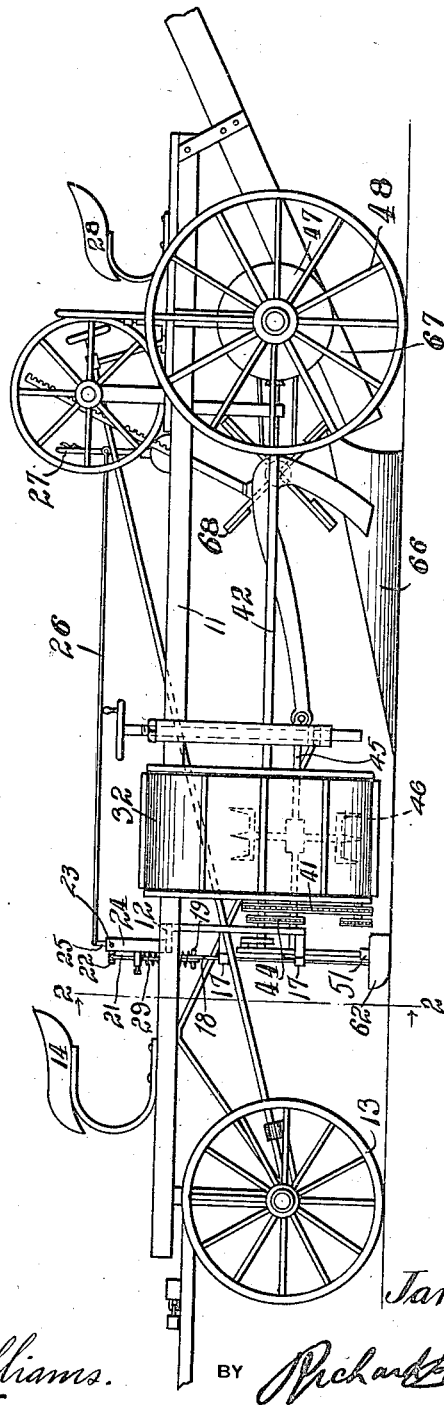

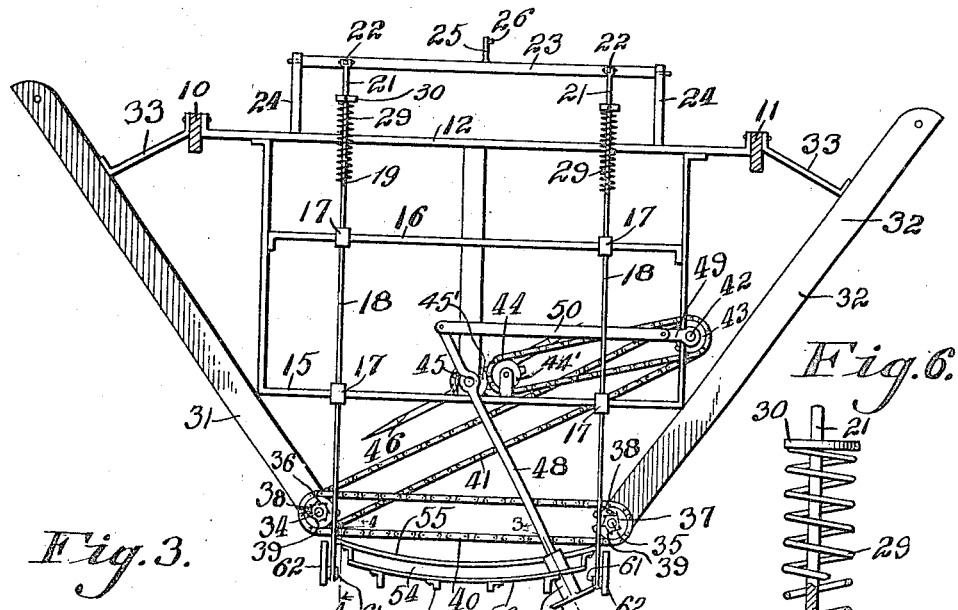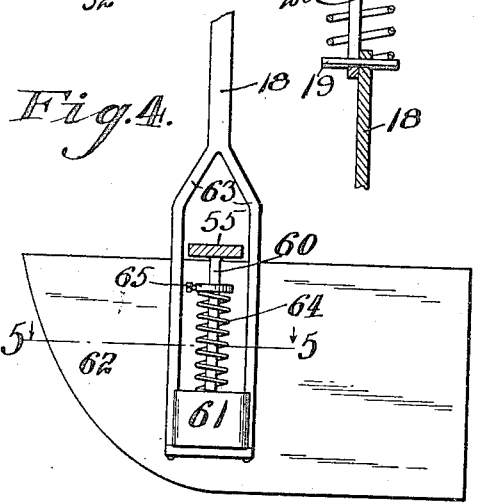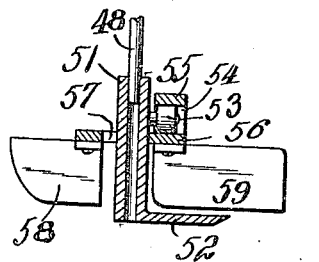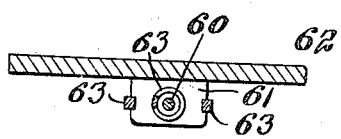

JAMES B. HANCOCK, OF CEDAREDGE, COLORADO.

BEET-TOPPING MACHINE.

1,222,099.     Specification of Letters Patent.     Patented Apr. 10, 1917.

Application filed July 19, 1916. Serial No. 110,165.

*To all whom it may concern:*

Be it known that I, JAMES B. HANCOCK, a citizen of the United States, residing at Cedaredge, in the county of Delta and State of Colorado, have invented certain new and useful Improvements in Beet-Topping Machines, of which the following is a specification.

This invention relates to an improved beet topping machine and the principal object of the invention is to provide a machine of the character described so constructed that the tops may be first severed from the roots and after the tops are removed thrown onto conveying belts by improved means.

Another object of the invention is to provide a beet topper so constructed that the topping mechanism and conveying belts for the severed tops may be actuated from a common shaft rotatably connected with the frame.

Another object of the invention is to provide an improved guiding means for the cutting knife so that as the carrying shaft oscillates, the knife will be guided in its movement.

Another object of the invention is to provide a machine of the character described which will be comparatively simple in construction and to further so construct the machine that it will be easy to adjust and operate.

This invention is illustrated in the accompanying drawings, wherein:—

Figure 1 is a view showing the improved beet topper in side elevation.

Fig. 2 is a transverse sectional view taken along the line 2—2 of Fig. 1, portions of the machine being omitted for the sake of clearness.

Fig. 3 is a fragmentary view taken along the line 3—3 of Fig. 2.

Fig. 4 is fragmentary sectional view taken along the line 4—4 of Fig. 2.

Fig. 5 is a sectional view taken along the line 5—5 of Fig. 4.

Fig. 6 is an enlarged view partially in section and partially in elevation showing the mounting of the spring shown in Fig. 2.

The frame of this machine is substantially rectangular and is provided with side bars 10 and 11. A cross bar 12 is connected with the side bars of the frame at a point to the rear of the forward wheels 13 and driver's seat 14 and carries a depending substantially U-shaped frame 15 braced intermediate its height by the bracing bar 16. This bracing bar 16 and the lower bar of the frame are provided with bearings 17 in which there are slidably mounted rods 18. These rods 18 are provided at their upper ends with pins 19 which extend through slots 20 in the hangers 21 pivotally connected with fingers 22 extending forwardly from the rocker shaft 23. This rocker shaft 23 is mounted by means of standards 24 and is provided with a lever arm 25 connected with the draw-rod 26 extending rearwardly of the machine and connected with the latch lever 27. This latch lever is mounted upon the frame adjacent the operator's seat 28 and it will thus be seen that by moving the latch lever, the rods 18 can be drawn upwardly and releasably held in the adjusted position. Springs 29 are mounted upon the hangers 21 between the pins 19 and the abutment collars 30 and while they permit vertical movement of the rods 18, serve to yieldably hold these rods in the normal position as shown in Figs. 2 and 6.

Conveyers 31 and 32 of the trough and belt type are positioned as shown in Figs. 1 and 2 and are supported by the brackets 33 with their upper ends extending beyond the side of the frame. Actuating shafts 34 and 35 extend through the lower ends of the conveyer troughs and carry ratchets 36 and 37 which are engaged by pawls 38 pivotally mounted upon the sprocket wheels 39. A sprocket chain 40 extends about these sprocket wheels 39 and it will thus be seen that when the machine is in operation, rotary motion can be transmitted from one sprocket wheel to the other. The sprocket wheel of shaft 34 is provided with a double set of teeth so that a sprocket chain 41 may transmit rotary movement from the driving shaft 42. This driving shaft 42 is provided with sprocket wheels 43 about which chains 41 and 44 pass, the chain 44 passing around a sprocket wheel 44' having engagement with a sprocket wheel 45' carried by the shaft 45 upon which is mounted the sweep 46. As the driving shaft 42 is rotated through a suitable shifting clutch connection with the disk 47 of the supporting wheel 48, the sweep will be rotated and one of the conveyers operated. If the gear of shaft 34 rotates in one direction, the shaft 34 will be rotated and the shaft 35 will remain idle whereas if it is rotated in the opposite direction, the shaft 35 will be rotated, and the shaft 34 will remain idle. Therefore the beet tops can be deposited upon the ground or in a suitable receptacle upon either side of the machine desired.

The rocker bar or arm 48 is pivotally mounted upon the shaft 45 and is connected with the crank arm 49 of the driving shaft 42 by means of the links 50. Therefore as the shaft 42 rotates, the rocker arm 48 will oscillate transversely of the frame. A sleeve 51 is slidably mounted upon this rocker bar and carries a cutting knife 52 which extends rearwardly and is provided with an arcuate cutting edge so that the knife can cut easily through the beets adjacent the tops thus removing the tops from the beet roots. The lower end of this rocker bar 48 travels between the rods 18 and the sleeve 51 is provided with a roller 53 which fits into the track 54 formed by the upper and lower bars or plates 55 and 56. The plate 56 is provided with a slot 57 through which the sleeve moves as shown in Fig. 3 and carries forward and rear supporting or guiding shoes 58 and 59, the blade 52 passing under the guides 59. It will thus be seen that with this device, the guiding shoes 58 and 59 will engage the beets and therefore the track will be raised to the proper height for the knife to cut the beet root at the proper point.

In order to permit the track to be raised, the end portions of the upper bar or plate 55 are provided with pins 60 which extend through blocks 61 carried by the supporting shoes 62 and slidably engaging the forks 63 of the rods 18. Springs 64 are positioned upon the pins 60 between the blocks 61 and the abutment collars 65 thus normally holding the shoes 62 and track in the relative position shown in Fig. 4.

When in use, the machine is driven across the field with the digging blades 66, two of which are provided, positioned upon opposite sides of a row of beets. As the machine moves along the row of beets, the shoes 58, 59 and 62 will slide along the ground thus yieldably supporting the track at the proper height. As the shoes engage the beets, the track will be vertically adjusted and as the arm 48 swings transversely of the frame, the beet tops will be severed from the roots. These beet tops will be engaged by the sweep 46 and thrown onto the proper conveyer up which they will be carried. The beet roots will then be removed from the ground by the blades 66 and thrown onto the conveyer 67 through the medium of the beater or paddle wheel 68. Any suitable receptacle can be provided at the upper end of the conveyer to receive the beet roots.

What is claimed is:—

1. A beet topping machine including a frame, a driven shaft, conveyer troughs carried by said frame, conveyer belts traveling in said troughs, a shaft rotatably mounted between said troughs, a sweep carried by said shaft, cutting means mounted in front of said troughs for severing the beet tops from the beet roots, means for transmitting rotary motion from said driven shaft to said conveyer belts, and means for transmitting rotary motion to said second shaft to rotate said sweep and move the severed beet tops onto a selected one of said conveyer belts.

2. A beet topping machine including a frame, a shaft rotatably mounted in said frame, a conveyer mounted in said frame, a sweep carried by said shaft for moving severed beet tops onto said conveyer when the shaft is rotated, a rocker bar mounted upon said shaft for oscillating movement thereon, cutting means mounted upon said rocker bar, means for rotating said shaft, and means for oscillating said rocker bar.

3. A beet topping machine including a frame, a shaft mounted in said frame, a rocker bar mounted upon said shaft for oscillating movement, a cutting knife slidably mounted upon said rocker bar, means for supporting said cutting means upon said rocker bar, and means for oscillating said bar to swing said cutting means into and out of an operative position.

4. A beet topping machine comprising a frame, a driving shaft rotatably carried by said frame, a driven shaft rotatably carried by said frame, a sweep carried by said driven shaft, a rocker bar rotatably mounted upon said driven shaft, means for transmitting rotary movement from said driving shaft to said driven shaft, means for transmitting oscillating movement from said driving shaft to said rocker bar, supporting rods carried by said frame, a track connected with said supporting rods, shoes carried by said supporting rods and track, and a cutting blade provided with a guiding roller engaging said track, said blade being slidably connected with said rocker bar.

5. A beet topping machine comprising a frame, a rocker shaft connected with said frame, fingers extending from said rocker shaft, hangers pivotally connected with said fingers, supporting rods slidably connected with said hangers, resilient means yieldably holding said supporting rods in a normal position, means for moving said rocker shaft for vertically adjusting said supporting rods, shoes slidably connected with the lower end portions of said supporting rods, a cross bar having its end portions extending above said shoes, pins extending from the end portions of said cross bar, springs mounted upon said pins and yieldably holding said shoes in their lowered position, a plate connected with said cross bar between said supporting rods and extending in spaced relation thereto and provided with a longitudinally extending slot, guiding shoes carried by said plate, a driven shaft carried by said frame, a sweep carried by said driven shaft, a rocker bar pivotally mounted on said driven shaft, a cutting knife positioned beneath the shoes of said plate and having a shank extending through the slot thereof, a roller carried by said shank and extending between said plate and cross bar, the shank of said cutting knife being slidably mounted upon the lower end portion of said rocker bar, means for rotating said driven shaft from said driving shaft, and means for transmitting oscillating movement from said driving shaft to said driven shaft.

6. A beet topping machine comprising a frame, supporting means carried by said frame, a cross bar connected with said supporting means, a guide carried by said cross bar, a rocker bar pivotally connected with said frame, a cutting knife engaging said guide and slidably connected with said rocker bar.

In testimony whereof I affix my signature in presence of two witnesses.

JAMES B. HANCOCK.

Witnesses:
　ALBERT ANDREW,
　F. W. CHILDS.

Copies of this patent may be obtained for five cents each, by addressing the "Commissioner of Patents, Washington, D. C."